Aug. 16, 1955    E. R. BEHN    2,715,721
SIGNAL CONTROL CIRCUIT FOR COUPLING TO METERING SYSTEM
Filed Nov. 5, 1949
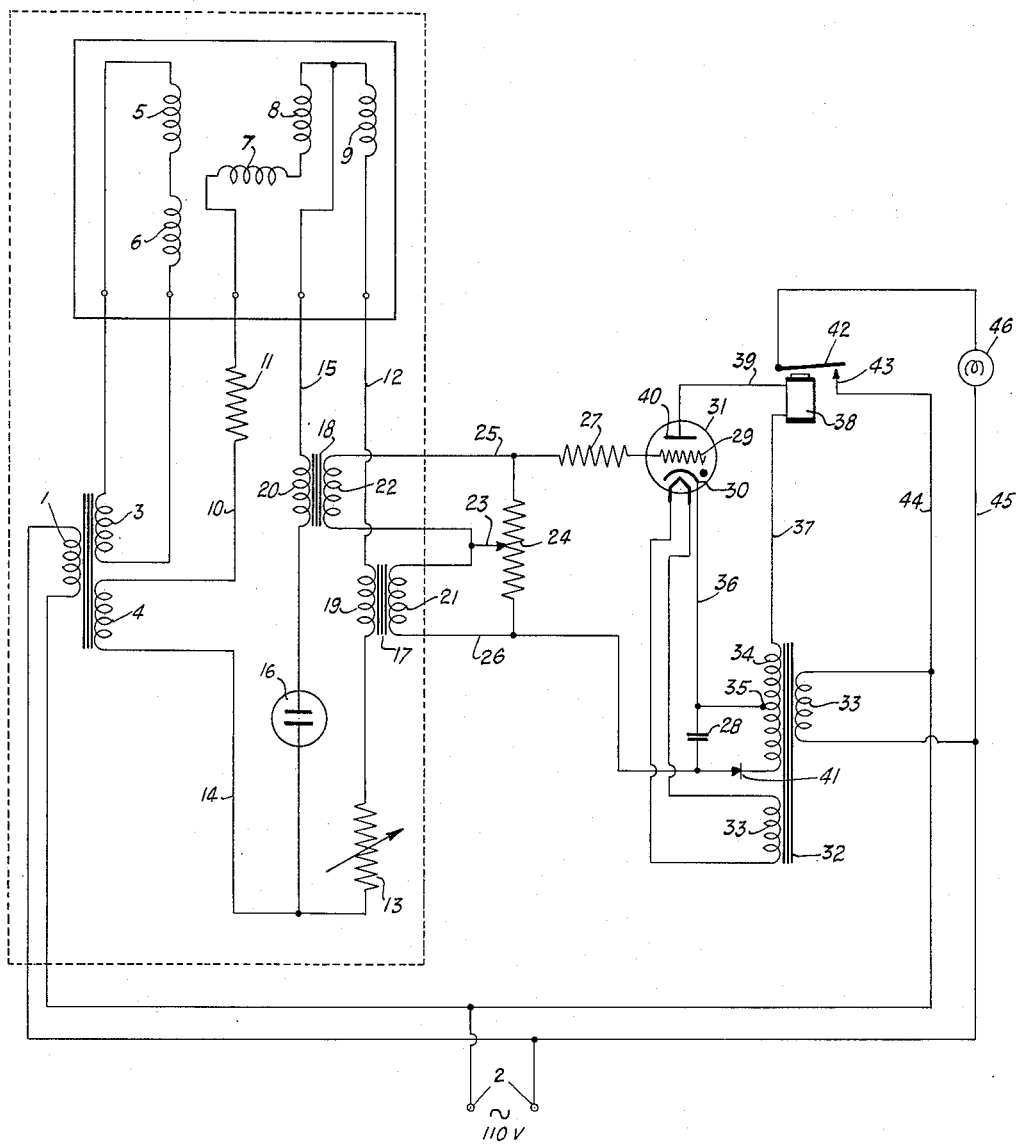
INVENTOR.
*Eric R. Behn,*
BY
*Edward L. Mueller*
ATTORNEY.

United States Patent Office 2,715,721
Patented Aug. 16, 1955

2,715,721

SIGNAL CONTROL CIRCUIT FOR COUPLING TO METERING SYSTEM

Eric R. Behn, Garden City, N. Y., assignor to Control Instrument Company, Inc., Brooklyn, N. Y., a corporation of New York Application November 5, 1949, Serial No. 125,812

3 Claims. (Cl. 340—253)

This invention relates to improvements in metering systems and has particular reference to a circuit therefor, to be used for controlling an alarm or other signaling device, or a servo mechanism responsive to and controlling a particular condition which said metering system has under continual surveillance.

Various methods of securing such alarm and control action in metering systems have heretofore been proposed, most of which, because of linkages coupled to the indicating mechanism or of additional mass to be carried thereby, suffer the obvious shortcoming of introducing inaccuracies beyond the tolerance to which these systems are required to operate.

In the present system it is proposed that by monitoring the currents used to actuate the indicating device, so as to determine variations therein, a control signal may be obtained to actuate the alarm or servo controlling circuit when that condition arises which necessitates such action. This suggested procedure has the advantage that the indicating mechanism is in no way burdened, so that its speed and accuracy of response are in nowise affected, calibration problems are reduced and the entire system becomes relatively independent of variations in supply voltages and currents.

The inventive idea herein involved is capable of receiving a variety of expressions, one of which for purposes of illustration is shown in the accompanying drawing, but it is to be expressly understood that the drawing and specification thereof are utilized only to describe, rather than to limit and define, the invention as a whole, reference being made to the appended claims for that purpose.

The drawing is a diagrammatic view of a metering system employing the features of the present invention applied to a signaling device.

The circuits of the present invention are shown in an adaptation to a salinity indicating system similar to that illustrated in the U. S. Letters Patent to Ellis, No. 2,306,691, dated December 29, 1942. Briefly, such a system comprises a line transformer having a primary 1 which is connected to a source of alternating voltage and current 2 and having high and low voltage secondaries 3 and 4. The indicating meter comprises the fixed field coils 5 and 6 connected to the secondary 3 of the line transformer and constantly maintained energized thereby. The meter further comprises a moving coil assembly consisting of the coils 7, 8 and 9 all of which are connected in series electrically and energized from the low voltage winding 4 of said line transformer and two of which are mechanically oriented at right angles to the third. The fields of the two coils 8 and 9, which are parallel and oriented at right angles to the coil 7, are opposed so that normally they cancel each other, and the third coil 7 being the only one having an active field will orient itself within the field of the coils 5 and 6 so that the indicating meter is normally positioned at center scale.

The secondary 4 is connected to the coil 7 by way of lead 10 and resistor 11. The current flows through coil 8 and then divides, a part flowing through coil 9 and by way of lead 12, resistor 13 and lead 14 returns to the transformer winding 4; and the remainder of the current also returns to the winding 4 by way of lead 15, the salinity cell 16 and lead 14. Thus, opposing torques are set up within the coils of the indicating meter depending upon the value to which the resistor 13 is adjusted and the conductivity of the solution in which the cell 16 is immersed. All of the foregoing applies to that portion of the drawing except the transformers 17 and 18 included in the dotted rectangle and is described in greater detail in said patent to Ellis, wherein the adjustments of the resistor 13, the values of resistor 11 and the proportion in which said currents initially divide, as well as the behavior of the meter, are completely discussed.

Since the position of the indicator is determined by the relative magnitudes of the currents flowing in the leads 12 and 15, transformers 17 and 18 are inserted in series with the said leads so that the current flowing therein flows in their primaries 19 and 20. The impedance of the primaries of these current transformers is extremely low, so that no material error is introduced into the meter reading, and no change is made in the calibration thereof, by their presence.

Secondaries 21 and 22 of the transformers are connected together at the variable tap 23 of the resistor 24 the ends of which are connected to the remaining transformer leads 25 and 26. The terminal voltage of each transformer varies with the setting of tap 23, depending upon the voltage division between the internal impedance of the transformer at the secondary terminals, and the resistance of portion of the resistor 24 connected across that secondary. If the secondary impedance is a complex one, the terminal voltage will vary in both magnitude and phase with the setting of tap 23, while if the secondary impedance is a pure resistance, only the magnitude will vary. If the secondary impedance is made a pure resistance, as by making the secondary winding self-resonant at the operating frequency, and if the connection of the secondaries 21 and 22 to the center tap and terminals of the resistor 24 is such that the secondary terminal voltages oppose one another (i. e., if like-poled leads of secondaries 21 and 22 are connected together at the variable tap 23), the result is essentially a null network with a null output for some setting of said tap, for any arbitrary distribution of currents having the same phase in the leads 12 and 15. Even if the secondary impedance is not a pure resistance, a null condition will be closely approached if the setting of the tap 23 required to approach the null conditions is not too close to either end of the resistor 24. The null network having been set to a null, changes in the current distribution in the leads 12 and 15 will give rise to changes in the voltage across the resistor 24, which voltage will change in magnitude and in phase depending on the magnitude and sense of the change in the ratio of the current in lead 12 to the current in lead 15.

The alternating voltage which is the output of the null network is connected by way of the resistor 27 and the capacitor 28 between the grid 29 and cathode 30 of the electron discharge device 31, resistor 27 being provided to prevent the tube 31 from being destroyed by the flow of excessive grid current.

A third transformer 32, whose primary 33 is energized from the supply source 2, is provided with secondaries 33' and 34. The secondary 33' supplies a filament voltage for the indirectly heated cathode illustrated as part of the tube 31. The secondary 34 is tapped at 35 for connection with the cathode 30 by the lead 36. One end of this secondary 34, by way of the lead 37, the coil of relay 38 and the lead 39, supplies energy to the anode 40, thus forming a circuit between the said anode, the cathode 30 and the return by way of lead 36 to said secondary. The other end of the secondary 34, by way of the rectifier 41, provides a uni-directional negative voltage which voltage is connected to lead 26, and thus by way of resistor 24 or the secondaries 21 and 22 of the current transformers, supplies a negative bias to the grid 29 of the tube 31. The return circuit again, as in the case of the plate 40, is established by way of the cathode 30 and lead 36 to the tap 35 on the transformer winding 34.

In order for the device to function, the secondaries 21 and 22 are so poled that an increase in the current of either lead 15 or 12 will cause an increase in the voltage across the resistor 24, whose magnitude is proportional to that increase, but whose phase corresponds to the phase of the voltage impressed by way of the relay 38 between the anode 40 and the cathode 39 of the tube 31 when the ratio of the current in lead 15 to that in lead 12 increases. This condition having been met, a change in the salinity of the liquid in which the cell 16 is immersed will cause a change in the current flow in the lead 15. The change in current flow through the meter will cause the meter to indicate the solution concentration as described in the aforementioned patent to Ellis, and the change in voltage across the resistor 24 resulting therefrom is applied to the grid 29 of the electron discharge tube 31.

When the alternating voltage which exists across the resistor 24, and which is caused by a change in current ratio in the leads 12 and 15, exceeds in its peak value the voltage being applied to said grid 29 by way of the rectifier 41 and is in phase with, rather than in phase opposition to, the voltage applied to the plate 40, the electron discharge device 31, being a gas filled tube such as a Thyratron, will fire and permit a large current to flow in its plate to cathode circuit.

This current flowing in the relay coil 38 will attract the relay armature 42 which on contacting the contact point 43 will close a circuit between the leads 44 and 45 which are connected to the voltage and current source 2 and thus cause the operation of the signaling device 46 which is shown for illustration as a lamp.

The desired level of current which will cause the firing of electron discharge device 31 can be determined in advance by the setting of the variable tap 23 on the resistor 24. Once set, a decrease in the conductivity of the solution in which the cell 16 is immersed may cause the appearance of a voltage across the resistor 24 but because this reduces the ratio of the current in lead 15 to that in lead 12, this voltage will be out of phase with the plate voltage applied to the tube and no action will occur. An increase in the conductivity and consequently in the current flowing in the leads 15 will, as shown, cause the grid to have a voltage impressed thereon in phase with the voltage impressed upon the grid and upon this voltage reaching a predetermined magnitude as determined by the bias and the setting of tap 23, an alarm will be caused to operate.

By relatively simple modification such as the sequential switching of a battery of salinity cells, more than one system or many points in one system may be constantly and sequentially checked; or the substitution of alarms such as bells or other indicating devices may be made for the signal light 46.

It is also possible to cause, by means of the operation of the relay 38, the actuation of a servo mechanism such as will dump the contents of the container being tested by the salinity cell 16 or cause the flow of a neutralizing liquid or the like.

What is claimed is:

1. In an electrical signaling apparatus adapted to compare the respective values of a reference current and a current which is variable with respect thereto, a pair of transformers having primary and secondary windings, said primary windings respectively being energized by said two currents, a comparison network coacting with said secondary windings and including means settable to produce a null condition of said network when said two currents are in a balanced relationship to each other, signal means coupled to said comparison network and responsive to the output voltage thereof for giving a warning indication when said currents are unbalanced in one sense, and signal suppression means effective when said currents are unbalanced in the opposite sense to prevent said signal means from giving said warning indication.

2. Apparatus as set forth in claim 1, wherein said settable means includes a resistor having a first terminal connected to an end of one secondary winding, a second terminal connected to an end of the other secondary winding, and a settable tap on said resistor connected to the remaining ends of said secondary windings to adjust said comparison network for the desired null condition, said network furnishing its output voltage to said signal means from said first and second terminals of said resistor.

3. Apparatus as set forth in claim 1, wherein said signal means includes an electron discharge device having a control grid the voltage of which is dependent upon the output voltage of said comparison network and an anode the voltage of which is independent of said output voltage, said signal suppression means controlling the voltage of said anode.

References Cited in the file of this patent

UNITED STATES PATENTS

| 2,168,031 | Howe | Aug. 1, 1939 |
| 2,306,691 | Ellis | Dec. 29, 1942 |
| 2,322,052 | Ogden | June 15, 1943 |
| 2,403,609 | Perkins | July 9, 1946 |
| 2,404,643 | Livingston | July 23, 1946 |
| 2,428,125 | Nicholson | Sept. 30, 1947 |
| 2,431,237 | Freeman | Nov. 18, 1947 |
| 2,437,951 | Godet | Mar. 16, 1948 |
| 2,439,711 | Bovey | Apr. 17, 1948 |
| 2,443,189 | Jenkins | June 15, 1948 |
| 2,446,719 | Ray | Aug. 10, 1948 |
| 2,520,476 | Stanback | Aug. 29, 1950 |
| 2,544,790 | Hornfeck | Mar. 13, 1951 |
| 2,564,221 | Hornfeck | Aug. 14, 1951 |
| 2,586,169 | Kline | Feb. 19, 1952 |

OTHER REFERENCES

Tubes at Work, in "Electronics," June 1942, page 116.